US011928985B2

(12) United States Patent
Karna et al.

(10) Patent No.: US 11,928,985 B2
(45) Date of Patent: Mar. 12, 2024

(54) CONTENT PRE-PERSONALIZATION USING BIOMETRIC DATA

(71) Applicant: International Business Machines Corporation, Armonk, NY (US)

(72) Inventors: Geetha Karna, Bengaluru (IN); Sreekanth L. Kakaraparthy, Bangalore (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 1123 days.

(21) Appl. No.: 16/175,271

(22) Filed: Oct. 30, 2018

(65) Prior Publication Data
US 2020/0135039 A1 Apr. 30, 2020

(51) Int. Cl.
*G09B 7/00* (2006.01)
*G06K 9/00* (2022.01)
*G06N 20/00* (2019.01)
*G06N 99/00* (2019.01)
*G06V 40/16* (2022.01)

(52) U.S. Cl.
CPC .............. *G09B 7/00* (2013.01); *G06N 20/00* (2019.01); *G06V 40/174* (2022.01)

(58) Field of Classification Search
CPC ...... G09B 7/00; G06K 9/00302; G06N 20/00; G06V 40/174
See application file for complete search history.

(56) References Cited

U.S. PATENT DOCUMENTS

| 2003/0088565 | A1* | 5/2003 | Walter | G06K 9/626 |
| 2008/0300797 | A1* | 12/2008 | Tabibiazar | G16B 40/30 |
| | | | | 702/19 |
| 2009/0068625 | A1* | 3/2009 | Petro | G09B 1/00 |
| | | | | 434/160 |
| 2011/0144914 | A1* | 6/2011 | Harrington | G01N 33/6893 |
| | | | | 702/19 |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

*Primary Examiner* — Eddy Saint-Vil
(74) *Attorney, Agent, or Firm* — Joseph P. Curcuru; George S. Blasiak; Heslin Rothenberg Farley & Mesiti P.C.

(57) ABSTRACT

Methods, computer program products, and systems are presented. The method computer program products, and systems can include, for instance: predicting an exhibited sentiment of a certain user on being presented one or more candidate education segment, wherein the predicting is in dependence on historical sentiment parameter values of one or more user on being exposed to presented educational content, the historical sentiment parameter values being stored in a data repository, wherein the presented education segments comprise digital media content adapted for playing by a digital media player; selecting at least one of the one or more candidate education segment in dependence on a result of the predicting so that a selected at least one of the one or more candidate education resulting from the selecting is personalized for the certain user; and presenting to the certain user the selected at least one of the one or more candidate education segment.

20 Claims, 11 Drawing Sheets

(56) References Cited

U.S. PATENT DOCUMENTS

| | | | |
|---|---|---|---|
| 2013/0097103 A1* | 4/2013 | Chari | G06N 20/10 |
| | | | 707/E17.089 |
| 2014/0172733 A1* | 6/2014 | Allen | G06Q 10/06 |
| | | | 705/327 |
| 2014/0287387 A1* | 9/2014 | Vukasinovic | G09B 7/02 |
| | | | 434/236 |
| 2015/0081611 A1 | 3/2015 | Shivakumar | |
| 2015/0339572 A1* | 11/2015 | Achin | G06N 20/00 |
| | | | 706/46 |
| 2016/0140958 A1 | 5/2016 | Heo et al. | |
| 2016/0357930 A1* | 12/2016 | Singh | G16H 50/30 |
| 2017/0011640 A1* | 1/2017 | Rebolledo-Mendez | |
| | | | G09B 5/00 |
| 2017/0132208 A1 | 5/2017 | Adavelli et al. | |
| 2017/0161855 A1* | 6/2017 | Schreyer | G06Q 50/167 |
| 2017/0185591 A1 | 6/2017 | Tetreault et al. | |
| 2019/0347287 A1* | 11/2019 | Crossno | G06N 20/00 |

\* cited by examiner

CONTENT PRE-PERSONALIZATION USING BIOMETRIC DATA

BACKGROUND

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: predicting an exhibited sentiment of a certain user on being presented one or more candidate education segment, wherein the predicting is in dependence on historical sentiment parameter values of one or more user on being exposed to presented educational content, the historical sentiment parameter values being stored in a data repository, wherein the presented education segments comprise digital media content adapted for playing by a digital media player; selecting at least one of the one or more candidate education segment in dependence on a result of the predicting so that a selected at least one of the one or more candidate education resulting from the selecting is personalized for the certain user; and presenting to the certain user the selected at least one of the one or more candidate education segment.

In another aspect, a computer program product can be provided. The computer program product can include a computer readable storage medium readable by one or more processing circuit and storing instructions for execution by one or more processor for performing a method. The method can include, for example: predicting an exhibited sentiment of a certain user on being presented one or more candidate education segment, wherein the predicting is in dependence on historical sentiment parameter values of one or more user on being exposed to presented educational content, the historical sentiment parameter values being stored in a data repository, wherein the presented education segments comprise digital media content adapted for playing by a digital media player; selecting at least one of the one or more candidate education segment in dependence on a result of the predicting so that a selected at least one of the one or more candidate education resulting from the selecting is personalized for the certain user; and presenting to the certain user the selected at least one of the one or more candidate education segment.

In a further aspect, a system can be provided. The system can include, for example a memory. In addition, the system can include one or more processor in communication with the memory. Further, the system can include program instructions executable by the one or more processor via the memory to perform a method. The method can include, for example: predicting an exhibited sentiment of a certain user on being presented one or more candidate education segment, wherein the predicting is in dependence on historical sentiment parameter values of one or more user on being exposed to presented educational content, the historical sentiment parameter values being stored in a data repository, wherein the presented education segments comprise digital media content adapted for playing by a digital media player; selecting at least one of the one or more candidate education segment in dependence on a result of the predicting so that a selected at least one of the one or more candidate education resulting from the selecting is personalized for the certain user; and presenting to the certain user the selected at least one of the one or more candidate education segment.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as example in the claims at the conclusion of the specification. The foregoing and other objects, features, and advantages of the invention are apparent from the following detailed description taken in conjunction with the accompanying drawings in which:

DETAILED DESCRIPTION

Figure 1:
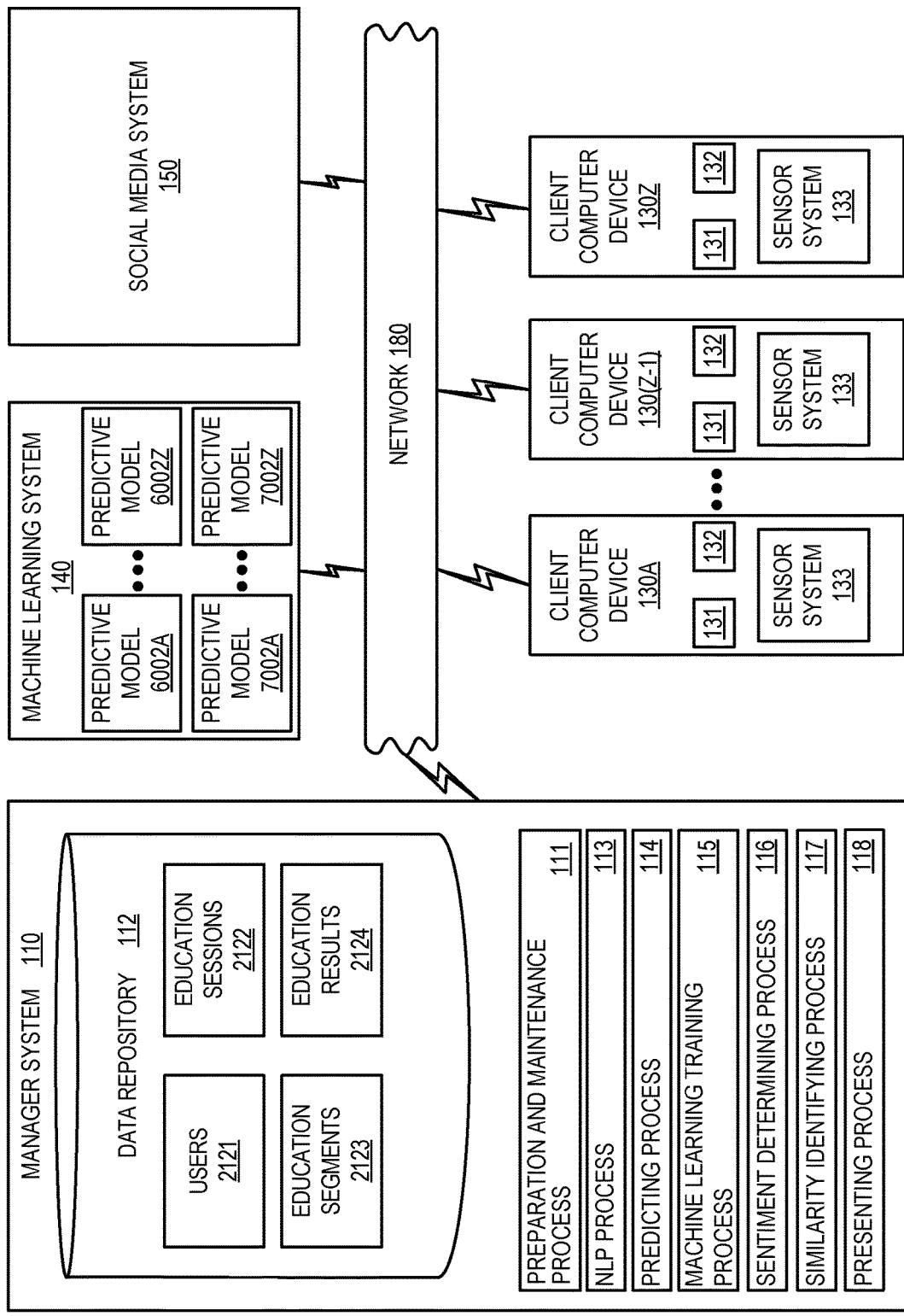
FIG. 1 depicts a system having manager system, client computer devices, machine learning system, and a social media system, according to one embodiment.

System 100 can include manager system 110 having an associated data repository 112, client computer devices 130A-130Z, machine learning system 140, and social media system 150. Manager system 110, client computer devices 130A-130Z, machine learning system 140 and social media system 150 can be in communication with each other via network 180.

System 100 can include numerous devices which can be computing node based devices, connected by network 180.

Network 180 can be a physical network and/or a virtual network. A physical network can include, for example, a physical telecommunications network connecting numerous computing-nodes or systems such as computer servers and computer clients. A virtual network can, for example, combine numerous physical networks or parts thereof into a logical virtual network. In another example, numerous virtual networks can be defined over a single physical network.

According to one embodiment, manager system 110 can be external to client computer deices 130A-130Z and machine learning system 140. According to one embodiment, manager system 110 can be co-located with one or more of client computer devices 130A-130Z, machine learning system 140, and/or social media system 150. Each client computer device of client computer devices 130A-130Z can include a display 131 and an audio output device, e.g. a speaker 132.

Each client computer device 130A-130Z can also include an associated sensor system 133, having one or more sensor. A sensor associated to a client computer device can be incorporated into a housing of a client computer device, e.g. as in a head worn electroencephalographic (EEG) sensor. Output of a sensor of sensor system 133 can vary in dependence on brain signals of a user. Each of the different client computer devices 130A-130Z can be associated to a different user. A computer device of client computer devices 130A-130Z, according to one embodiment, can be a computing node device provided by a client computer, e.g. a mobile device, e.g. a smartphone, tablet, laptop, smartwatch, or PC that runs one or more program e.g. including a web browser for opening and viewing web pages.

A sensor of sensor system 133 can include e.g. a camera sensor. A camera sensor can provide video data for processing to determine facial expressions from which set of sentiment parameter values can be provided and returned. A camera sensor can provide eye gaze video data, which can be processed for return of a set of sentiment parameter values. Embodiments herein recognize that a user's facial expression and/or eye gaze can be in dependence on brain signals produced by the user. A sensor of sensor system 133 can additionally or alternatively include an EEG sensor, which directly senses electrical activity of a user's brain. Output data from an EEG sensor can be processed to return a set of sentiment parameter values for a user. An EEG sensor can be provided with use of commercially available hardware such as the EMOTIV EPOC+ mobile EEG headset available from Emotiv Inc. of San Francisco, CA (EMOTIV EPOC+ is a registered trademark of Emotiv Inc. of San Francisco, CA).

Machine learning system 140 can be provided by a machine learning service that provides deployment of models and management of deployed models, online deployment, scoring, batch deployment, stream deployment, monitoring and retraining deployed models. For example, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation). A machine learning service provided by IBM® WATSON® can provide access to machine learning algorithm nodes and/or neural network nodes. A machine learning service provided by IBM® WATSON® can provide access to a set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. According to one embodiment, predictive models 6002A-6002Z can predict users returned exhibited sentiment in response to being presented with content of a certain topic classification dataset and content classification dataset. Predictive models 7002A-7002Z can predict a user's performance e.g. learning material retention performance, in dependence on an exhibited sentiment of the user.

Social media system 150 can include a collection of files, including for example, HTML files, CSS files, image files, and JavaScript files. Social media system 150 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computer devices of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Manager system 110 can include a messaging system in one embodiment.

Embodiments herein recognize that learners read through learning material and/or watch videos to understand and enhance their knowledge. In today's technology world Learning Management Systems (LMS) have launched online content to the students. Embodiments herein recognize that learners face difficulty in grasping a piece of content or concept which results in developing a fear of understanding that concept or losing interest. Learners can for example search for meanings/synonyms/antonyms of a complicated word or sentence e.g., a user might find a sentence "education is the manifestation of perfection already in mankind" to be difficult to comprehend, but might find "education brings out the perfection already in mankind" easier to understand (because of how their brains work, how their past learning have been, etc.). Embodiments herein recognize that this "simplification" varies from person-to-person, as their experiences vary, and brains work differently Embodiments herein recognize that some individuals will be alike with other individuals in terms of how their brains are "wired to work" as well as the learning experiences that they have gone through Embodiments herein provide a smart way of offering pre-made digital content based on user biometric signal data (e.g. facial expression video, eye gaze video, EEG) via learning how a given user's brain reacts through calibration sessions, and pre-processing scanned digital content just-in-time before presenting to the specific user specifically to personalize for him/her to reduce his/her brain load. In case the expected reaction of the user towards some content is not known (no training done on the specific training data), then the reaction of other users with similar reactions towards other content that this user has seen as well as those other users have seen before can be subject to processing.

Data repository 112 can store various data in users area 2121. Data repository 112 can store data on users of system 100 e.g. contact information, preferences, as may be determined by query of social media system 150, biographical data e.g., as determined by querying social media system 150 and/or input data by input by a user on registration into system 100. Data repository 112 and education sessions area 2122 can store data that specifies education sessions that can be offered by system 100.

Education sessions can include digital content e.g. audio and/or video (audiovisual) digital content that can be presented by manager system 110 to a client computer device. Educational sessions can include, according to one embodiment, a sequence of educational segments e.g. predetermined sequence or adaptively determined sequence. Educational sessions data of educational sessions area 2122 can store data that specifies educational sessions for a variety of topic classification datasets.

Data repository 112 in education segments area 2123 can store data on education segments that can be combined to define an educational session. Data repository 112 and education segments area 2123 can store, for each education segment, a plurality of differentiated versions. The differentiated versions can have different associated difficulty levels as subjectively seen from the respective viewpoints of different users. Embodiments herein recognize that the minds of different respective users work differently. A first education segment may be easy to understand for a first user and can be difficult to understand for a second user. There can be, according to one embodiment, two or more versions of each education segment stored in education segments area 2123, each version having a differentiated content. The differentiated content can provide alternative presentation of a common education topic.

Data repository 112 in education results area 2124 can store data on results associated with education sessions that are presented to various users of system 100. Education results area 2124 can store data that specifies education sessions and education segments that have been presented to users and associated returned sentiments of users that have been exhibited in response to presentment of education segments. Education results area 2124 can also include question and answer results data, associated to education sessions that are presented to users. Such education sessions have an associated question and answer content. Manager system 110 can run various processes, including preparation and maintenance process 111, natural language processing (NLP) process 113, predicting process 114, machine learning training process 115, sentiment determining process 116, similarity identifying process 117, and presenting process 118.

Manager system 110 running preparation maintenance process 111 can prepare and maintain data for storage in data repository 112 so that such data is adapted for use by various other processes run by manager system, including processes 113-118.

Manager system 110 can run NLP process 113 to process data for preparation of records that are stored in data repository 112 and for other purposes. Manager system 110 can run NLP process 113 for determining one or more NLP output parameter of a message. NLP process 113 can include one or more of a topic classification dataset process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter. By running of NLP process 113 manager system 110 can perform a number of processes including one or more of (a) topic classification dataset and output of one or more topic NLP output parameter for a received message (b) sentiment classification and output of one or more sentiment NLP output parameter for a received message or (c) other NLP classifications and output of one or more other NLP output parameter for the received message. Topic analysis for topic classification dataset and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Manager system 110 running predicting process 114 can, for example, predict a user's exhibited sentiment e.g. as exhibited in a set of sentiment parameter values, in response to the user being presented with a candidate education segment having certain characteristic, such as a certain topic classification dataset and content classification dataset. Manager system 110, running predicting process 114, according to one embodiment, can additionally or alternatively include manager system 110 predicting a user's performance, e.g. education material retention performance, in dependence on the users exhibited sentiment e.g. as exhibited in set of sentiment parameter values. Manager system 110 running predicting process 114 can include manager system 110 running machine learning training process 115. Manager system 110 running machine learning training process 115 can include manager system 110 training various predictive models that can be instantiated by machine learning system 140. Manager system 110 running machine learning training process 115 can train various predictive models using data from education results area 2124 of data repository 112, which education results data can include such data as specifying a user's exhibited sentiment in response to being presented with a certain education segment, having a certain topic and/or difficult classification.

Data of education results area 2124, for use of training predictive models, can include such data as question and answer results data associated to an education session having one or more education segment. Manager system 110 running sentiment determining process 116 can include manager system 110 determining a set of sentiment parameter values based on processing of sensor output data, output by one or more sensor of a sensor system 133 associated to a client computer device. Manager system 110 running sentiment determining process 116 can include manager system 110 performing processing of video data representing facial expressions of users who are being presented an education session or can include processing of data representing an eye gaze of a user being presented an education session and/or can include processing of EEG signals, provided by a user who is being presented an education session.

Manager system 110 running similarity identifying process 117 can include manager system 110 performing data processing to identify users of system 100 who will behave similarly to a certain user of system 100 in terms of exhibited sentiment on exposure to certain and characterized educational content. Manager system 110 running similarity identifying process 117 can include manager system 110 employing clustering algorithms e.g. K means clustering algorithms. Various clustering methodologies can be used, e.g. connectivity-based clustering, centroid-based clustering, distribution-based clustering, density-based clustering.

Manager system 110 running presenting process 118 can include manager system 110 presenting users of system 100 who are users of respective client computer devices 130A-130Z with educational content of education sessions defined by education segments. Manager system 110 running presenting process 118 can include manager system 110, selecting from candidate education segments in dependence on an output return by manager system 110 running predicting process 114. Manager system 110 running presenting process 118 can include manager system 110 presenting educational content in a manner that is adaptive to a predicting returned by running of predicting process 114.

Embodiments herein recognize that users can be expected to learn more efficiently when they exhibit more positive sentiments as may be indicated by a threshold exceeding "joy" sentiment parameter value on a scale of 0.0-1.0. Accordingly, manager system 110 running presenting process 118 can present content in a manner to optimize a user's predicted exhibited "Joy" sentiment parameter value. Embodiments herein recognize that users can be expected to learn more efficiently when they exhibit more positive sentiments as may be indicated by a threshold exceeding "positive" sentiment parameter value on a scale of 0.0-1.0. Accordingly, manager system 110 running presenting process 118 can present content in a manner to optimize a user's predicted exhibited "positive" sentiment parameter value.

Embodiments herein recognize that a difficulty level of a user in respect to learning from certain presented educational content can be inferred from user's exhibited sentiment in response to being presented with the certain educational content. According to one embodiment, a user exhibiting relatively higher valued positive sentiment parameter values (e.g. "joy" in the case of non-polar sentiment classification system or "positive" in the case of a polar classification system) can be inferred to be experiencing a relatively low level of difficulty with respect to the presented educational content. According to one embodiment, a user exhibiting relatively higher valued negative sentiment parameter values (e.g. "Anger," "Fear," and/or "Disgust," in the case of non-polar sentiment classification system or "negative" in the case of a polar classification system) can be inferred to be experiencing a relatively high level of difficulty with respect to the presented educational content.

Embodiments herein recognize that while users in general may learn more efficiently when exhibiting a positive sentiment that there is differentiation between users. For example, some users when learning at optimum efficiency can be exhibiting relatively higher negative sentiment parameter values and relatively lower positive sentiment parameter values e.g. higher negative sentiment parameter values of "Anger," "Fear," and/or "Disgust," (or a higher "negative" sentiment parameter value in the case a polar sentiment classification system is employed) and lower sentiment parameter values of "joy" (or a lower "positive" sentiment parameter value in the case a polar sentiment classification system is employed).

Manager system 110 running presenting process 118 can include manager system 110 presenting content to a user in accordance with predictive set of sentiment parameter values exhibited of a user to induce the user to exhibit a set of sentiment parameter values that coincides with that users optimal learning efficiency. Manager system 110 running presenting process 118 can include, for configuring manager system 110 to perform presenting process 118, manager system 110 can operate in accordance with the real time transport protocol (RTP) which is set forth in requests for comments (RFC) 3550, published by the Internet Engineering Taskforce (IETF) and the Internet Society (ISOC).

Figure 2:
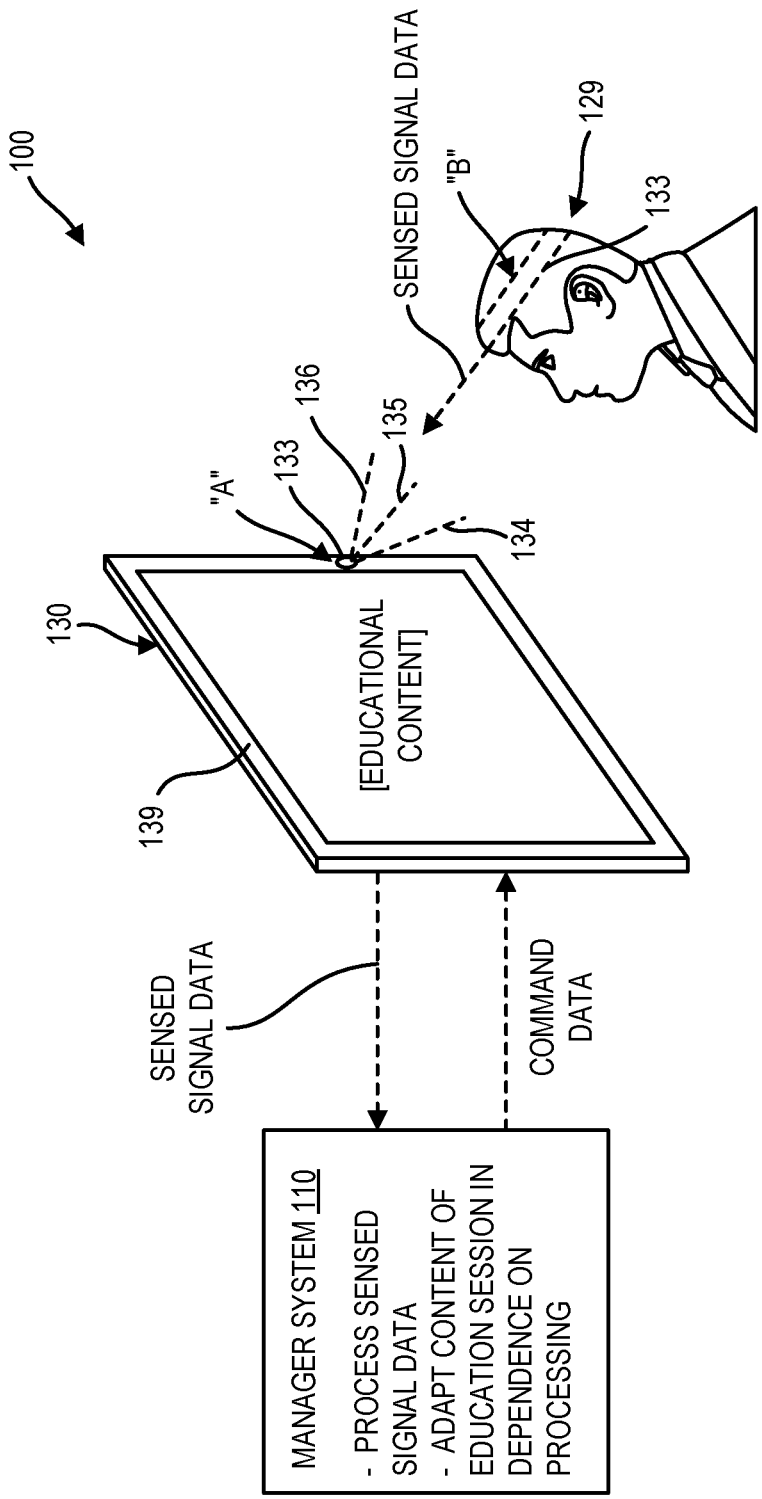
FIG. 2 is a physical schematic view of the system as shown in FIG. 1, according to one embodiment.

FIG. 2. depicts a physical schematic diagram of system 100. Referring to the physical schematic diagram of FIG. 2, a user 129 associated with client computer device 130 can be presented with educational content that is presented by client computer device 130. Client computer device can have a sensor system 133. A sensor of sensor system 133 at location A can include a camera internally disposed in a primary housing 139 of client computer device 130. A camera at Location A can include an imaging axis 135 and a field of view limited by boundary rays 134 and 136 so that a field of view of client computer device 130 encompasses face of user 129. A sensor of sensor system 133 associated to client computer device. at location B can include an EEG sensor which senses electrical brain signals of user 129 directly. The camera at location A can send output data representing a spatial image of user 129, which image data can be subject to facial recognition and/or eye gaze processing, wherein facial expressions and/or eye gazes of a user are in dependence on brain signals of user 129. Client computer device 130 can represent any one of client computer devices 130A-130Z as shown in FIG. 1. An EEG sensor can be provided with use of commercially available hardware such as the EMOTIV EPOC+ mobile EEG headset available from Emotiv Inc. of San Francisco, CA (EMOTIV EPOC+ is a registered trademark of Emotiv Inc. of San Francisco, CA).

In one embodiment, client computer device 130 as shown in FIG. 2 (representative of any client computer device of client computer devices 130A-130Z) can include all the sensors described and in one embodiment can include only one such sensor. For example, client computer device 130 can transmit biometric signal data e.g. in the form of image data and/or EEG signal data to manager system 110 for processing by manager system 110. Manager system 110 can process received biometric signal data and can adapt content of an education session in dependence on the processing. Manager system 110 can send command data to client computer device 130 in dependence on processing received biometric signal data. The processing can be in dependence on historical data stored in data repository 112. The command data sent by manager system 110 can adjust difficult level of an education segment that is presented by client computer device 130. The difficulty level can be a subjective difficulty level, i.e. personalized difficulty level predicted for the learning user being presented the educational content. Educational content can be adapted by manager system 110 to induce a targeted sentiment by user 129 so that user 129 optimally engages and learns from presented educational content.

Figure 3:
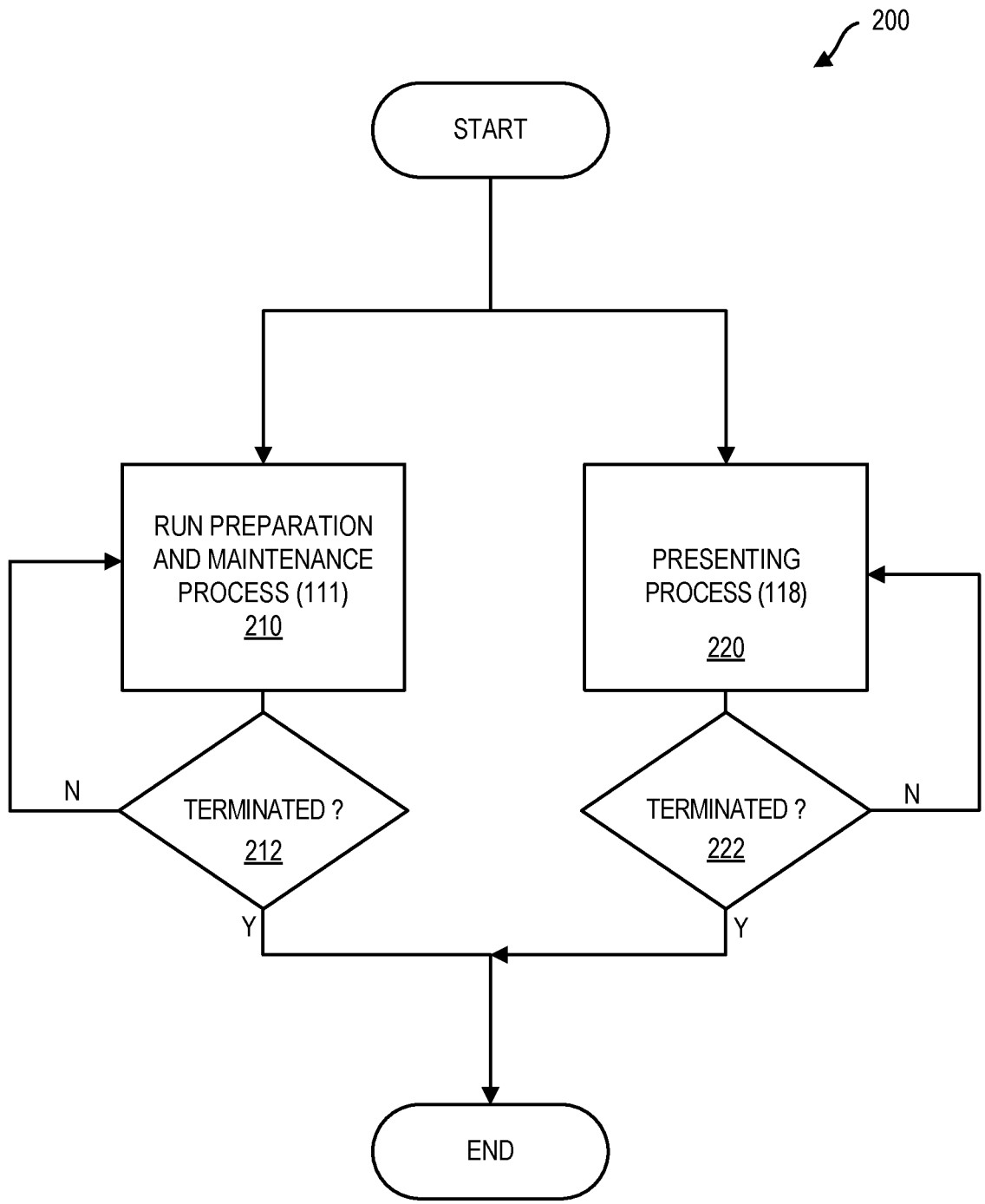
FIG. 3 is a flowchart illustrating a method for performance by a manager system according to one embodiment.

FIG. 3 is a flowchart illustrating coordination of processes that can be performed by manager system 110 of FIGS. 1 and 2, in accordance with one or more embodiments set forth herein.

At block 210, manager system 110 can run preparation and maintenance process 111 to populate prepare and maintain various data of data repository 112 including data of locations areas 2121-2124. Manager system 110 can run preparation and maintenance process 111 iteratively until process 111 is terminated at block 212.

At block 220, manager system 110 can run presenting process 118 to present educational content to a user. For support of running of presenting process 118 iteratively, manager system 110 can be running e.g. processes 113-117 iteratively and can be running a plurality of instances of the processes 113-117 simultaneously. Manager system 110 can run presenting process 118 until presenting process 118 is terminated at block 222. Manager system 110 can run preparation and maintenance process 111 and presenting process 118 concurrently and can run each of process 111 and process 118 iteratively.

Figure 4A:
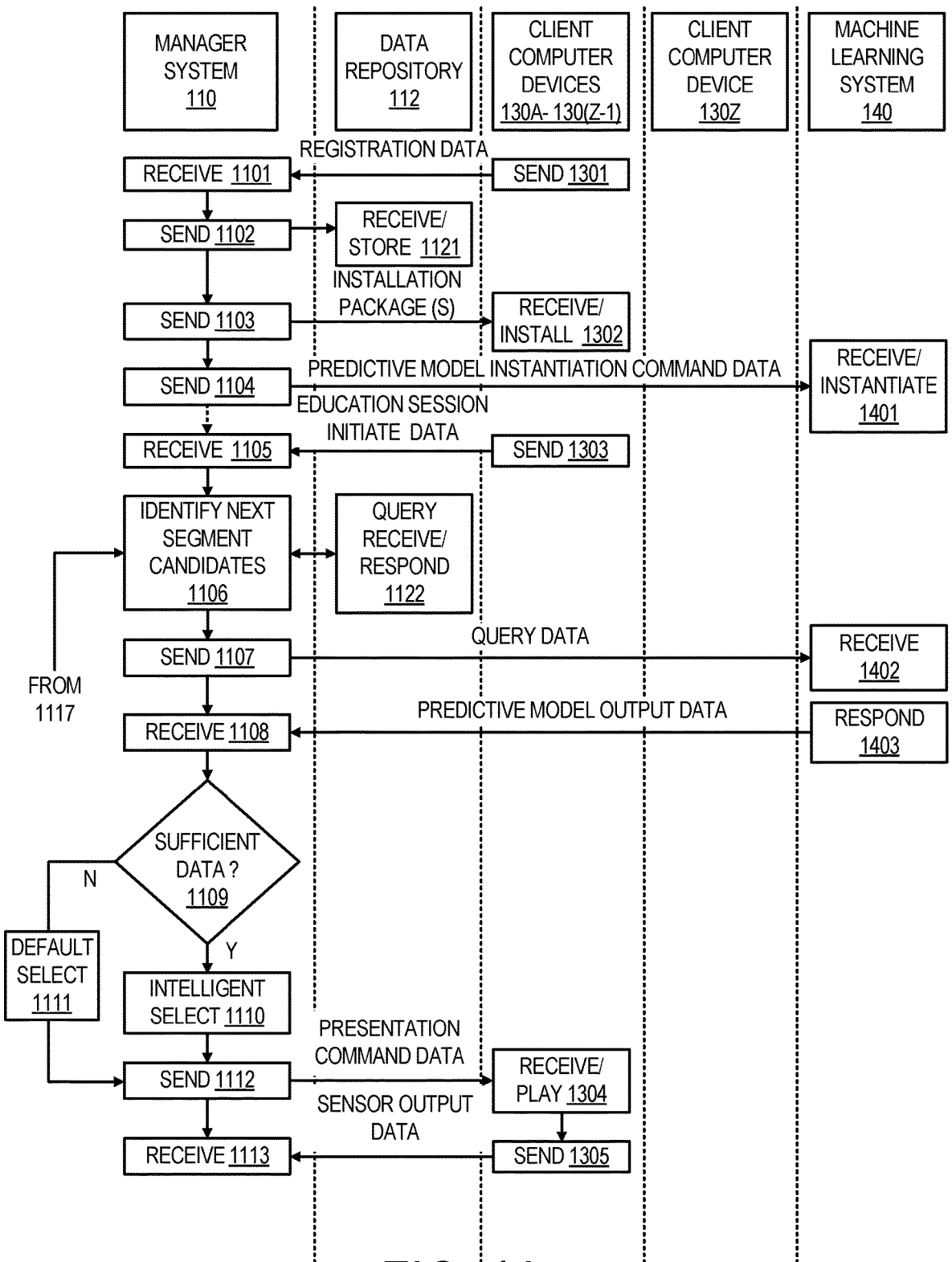
FIGS. 4A-4B is a flowchart illustrating a method for performance by a manager system interoperating with other components according to one embodiment.
Figure 4B:
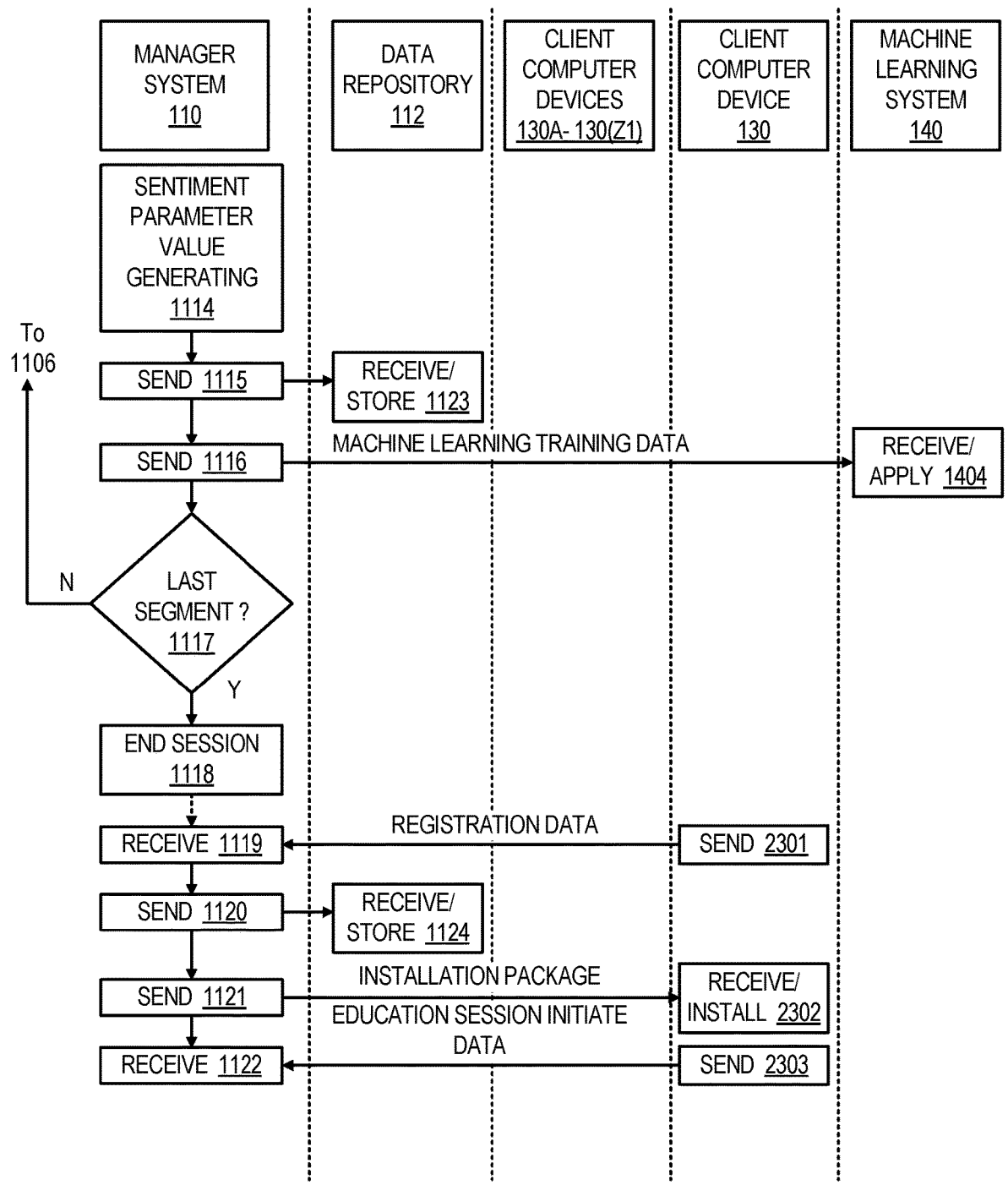

The flowchart of FIG. 4A-4B depict the method for performance by manager system 110 interoperating with its associated data repository 112 of client computer devices 130A-130Z and machine learning system 140. At block 1301 client computer devices 130A-130(Z-1) can be sending registration data for receipt by manager system 110 at block 1101. At block 1101 manager system 110 can receive registration data and can send the registration data for storage by data repository 112 at block 1102. At block 1121 data repository 112 can receive the registration data received from the user or defined by a user and can store such registration data into users area 2121 of data repository 112. A user can be using a user interface 5000 as set forth in FIG. 5.

A user can use area 5010 to enter in user registration data. In area 5011 a user can enter contact information e.g. name, home address, email address, social media account data, and the like. In area 5012, a user can enter education level data e.g. number of years in school, degrees attained, and the like. At block 1102, manager system 110 can send for storage into data repository 112 received registration data received from one or more user at block 1101.

In response to registration data received from a user can include data that grants manager system 110 for mission to query social media accounts of registered users, accordingly manager system at block 1101 can query data from social media system 150 to return e.g. data on preferences of users and can send for storage at block 1102 preference data of users as determined by querying of data of social media system 150. Manager system 110, querying data of social media system 150, can include manager system 110 activating NLP process 113 to return topics in dependence on text-based data of users in the form of social media posts of various users.

In response to receiving registration data from various users, manager system 110 at block 1103 can send installation packages to client computer devices 130A-130(Z-1). Client computer devices 130A-130(Z-1) can receive installation packages at block 1302 and can respectively install received installation packages at block 1302. Received installation packages installed at block 1302, facilitate the participation of client computer devices 130A-130(Z-1) in system 100. Installation packages can include, for example, media player software, so that respective client computer devices of client computer devices 130A-130(Z-1) can play digital educational content, received from manager system 110. Installation packages can include, for example, libraries and executable code. Installation packages when installed can facilitate a respective client computer device of client computer device 130A-130(Z-1) receiving digital educational content, playing of that content, obtaining of biometric signals of one or more sensor associated to a client computer device and forwarding biometric signal data for processing by manager system 110.

In response to completion of block 1103, manager system 110 can proceed to block 1104. At block 1104, manager system 110 can send predictive model instantiation command data for receipt by machine learning system 140 at block 1401.

At block 1401, machine learning system 140 can instantiate a predictive model for each new registered user sending registration data at block 1301. Instantiated predictive models instantiated at block 1401 can be trained with training data by way of machine learning so that the predictive models are able to predict a returned sentiment of a user in response to being presented with educational content by a client computer device 130. Instantiated predictive models instantiated at block 1401 can include predictive models 6002A-6002Z as set forth in FIG. 1. A process for training of predictive model 6002A-6002Z are set forth herein. There can be instantiated one predictive model of predictive models 6002A-6002Z for each user of system 100.

At block 1303 a client computer device of client computer devices 130A-130(z-1) can send education session initiate data for receipt by manager system 110 at block 1105. Education session initiate data can be defined by a user using user interface 5000 as set forth in FIG. 5. A user can select an education session using area 5020 of user interface 5000 which can be a manually operated displayed user interface displayed under displayed of a client computer device. In area 5020, a menu of education sessions can be displayed, and a user can select one option from the displayed menu. Each option can be associated to an education session having a plurality of education segments. In area 5022, a user can enter textual data in manager system 110 and can activate NLP process 113 to examine the entered textual data to discern an education session selection of a user. A user can use area 5021 and/or area 5022 to define education session selection data and the education session initiate data, sent to block 1303, can be sent in response to the entered education session selection data. In response to the receipt of education session selection initiate data, received at block 1105, manager system 110 can proceed to block 1106. Manager system 110 at block 1106 can identify next segment candidates of an education session. Table A depicts an organization for education session according to one embodiment.

TABLE A

| SEGMENT ORDER | CANDIDATE SEGMENTS | RETURNED SEGMENT | UUID | TOPIC CLASSIFICATION DATASET | CONTENT CLASSIFICTION DATASET |
|---|---|---|---|---|---|
| 1 | SEGMENT A-1 SEGMENT A-2 SEGMENT A-3 | SEGMENT A-1 | XXXX | XXXX; XXXX | TEXT = 0.XX; GRAPHICS = 0.XX; EXPLANATORY CONTENT = 0.XX; EXAMPLE CONTENT = 0.XX |
| 2 | SEGMENT B-1 SEGMENT B-2 SEGMENT B-3 | SEGMENT B-2 | XXXX | XXXX | TEXT = 0.XX; GRAPHICS = 0.XX; EXPLANATORY CONTENT = 0.XX; EXAMPLE CONTENT = 0.XX |
| 3 | SEGMENT C-1 SEGMENT C-2 SEGMENT C-3 | SEGMENT C-1 | XXXX | XXXX; XXXX; XXXX | TEXT = 0.XX; GRAPHICS = 0.XX; EXPLANATORY CONTENT = 0.XX; EXAMPLE CONTENT = 0.XX |
| " " | " " | " " | " " | " " | " " |

As set forth in Table A, an education session can include a plurality of education segments, which are presented in accordance with an education segment order e.g. there is initially presented a segment having segment order 1, and subsequently having segment order 2, and subsequently having segment order 3, and so on. For each segment order, there can be provided a plurality of candidate segments, each having an associated topic classification dataset and content dataset.

System 100 can be configured to present an education session having a plurality of education segments, wherein the education segments are adaptively determined. As set forth in Table A, manager system 110, for each segment order, can select one segment of a set of candidate segments to provide a returned segment. Each returned segment can be a segment having data stored in education segments area 2123 of data repository 112. Education segment data can include e.g. a universally unique identifier (UUID), a topic classifier dataset, and a content classifier dataset. A topic classifier dataset can specify one or more topic of an education segment, e.g. which can be returned in response to activation of NLP process 113. A content classifier dataset can specify content parameter values of an education segment, e.g. on a scale of 0.0 (not characterizing segment) to 1.0 (characterizing segment. Content parameters can include e.g. "text," "graphics," "explanatory," "example," "questions." A content classification of text=0.2; graphics=9.0; explanatory=0.7, example=0.1; question=0.2 can be returned where an education segment has a small amount of text, has extensive graphics, significant explanatory content (e.g. definitions), a small amount of example content, and a small amount of questions content. Content classifications can be manually provided or manager system 110 can be configured to automatically return content classification scores based on an electronic scan of a provided education segment.

Manager system 110 can return a topic classifier dataset for a segment e.g. using it by activation, using NLP process 113, which can be activated to return a topic e.g. associate to text or graphical content of an author education segment. Manager system 110 can return a content classification dataset for a segment stored in education segments area 2123 e.g. by scanning provided segments by activation of NLP process and other processing algorithms e.g. to identify graphical content and to discriminate text and graphics. Throughout the course of deployment of system 100, manager system 110 can iteratively re-examine education segments having data stored in education segments area 2123 to potentially reclassify topic classifiers for the segments and/or difficulty classifiers for the segments e.g. as topic classification and content classification datasets evolve and/or as a corpus of data stored in data repository 112 increases.

At block 1106, manager system 110 can identify next segment candidates for a returned segment defining a current selected education session. During a first pass through block 1106, manager system 110 can identify candidate segments of segment order No. 1 of a current education session. Referring to Table A, in the described example, manager system 110 at block 1106 can identify the candidate segments having the referenced names segments A-1, segment A-2, and, segment A-3. Manager system 110 can perform block 1106 with use of plurality of queries of education sessions area 2122 and/or education segments area 2123 of data repository 112 as indicated by data repository 112 performing query received at block 1122.

Figure 6:
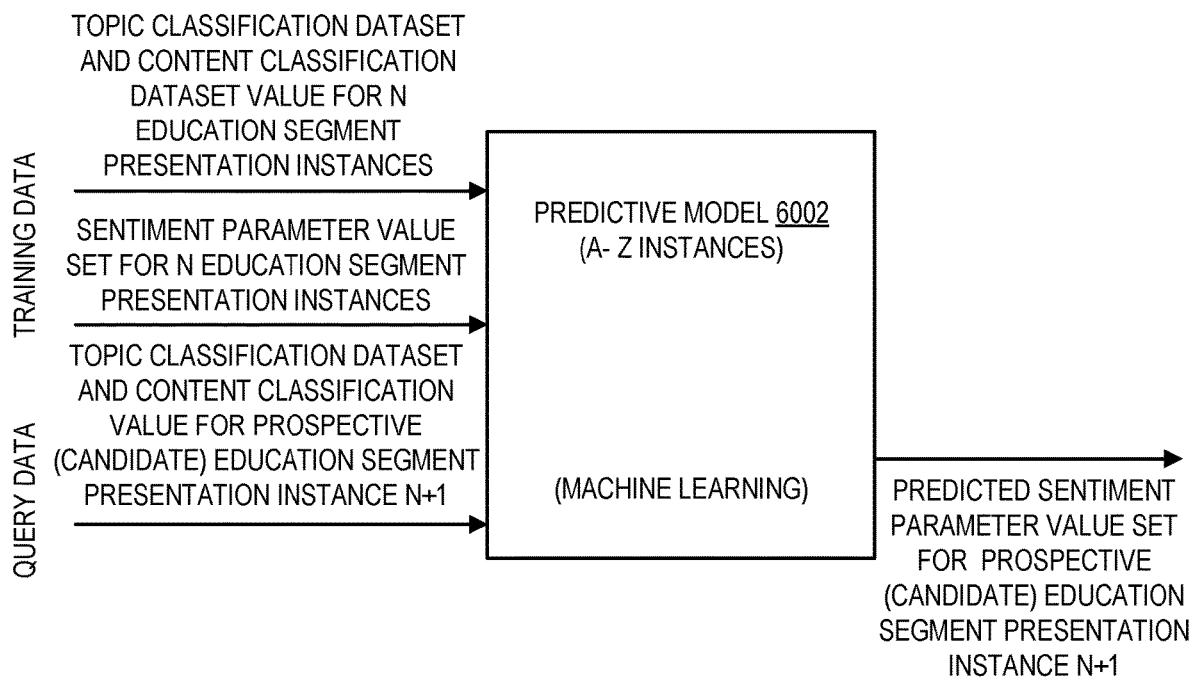
FIG. 6 depicts a predictive model that can be trained using supervised machine learning processes according to one embodiment.

Training of predictive models 2002 having instances A-Z to define predictive model 6002A-6002Z, is set forth in reference to FIG. 6. Predictive model 6002 can be trained with supervised machine learning, by application of training data to predictive model 6002. As set forth in FIG. 6, training data can include data of historical instances in which a certain user was subject to an education segment. For each past segment presented to a user, there can be applied as training data a topic classification dataset, and content classification dataset values for each segment, and such data can be accompanied by a responsive sentiment exhibited by the user in response to the presented segment. Predictive model 6002, on being trained, can be configured to be responsive to query data. Query data applied to predictive model 6002, can be provided by data of a perspective education segment that can be prospectively presented to a user. The segment data can include a topic classification dataset value and a difficult classification value for perspective instance. Output data, output by predictive model 6002, can include a predicted set of sentiment parameter values for the prospectively presented education segment, represented as input query data.

At block 1107, manager system 110 can send query data for receipt by predictive model 6002A-6002Z, corresponding to the user of the client computer device, sending the education session and initiate data at block 1303. The query data can be query data for ascertaining a predicted set of sentiment parameter values, associated with the return candidate segments, identified at block 1106 e.g. in the described example from Table A. Segment A-1, Segment A-2, Segment A-3, each having a UUID, a topic classification dataset, and a content classification dataset. The predictive model can return output data in the form of a predicted set of sentiment parameter values. For each of the three sets of query data, it can send the predictive output sentiment parameter data to manager system 110 for receipt by manager system at block 1108.

At block 1109, manager system 110 can determine whether return data is sufficient for performance of an intelligent selection of a next segment. Predictive model output data sent at block 1303 can have an associated accuracy confidence level, specifying a level of confidence associated to the output predicted model data. Such confidence level can be a value in dependence on a number of training iterations of the predictive model. Manager system 110 can return a decision that data is insufficient where a returned confidence level does not exceed a threshold. For example, if a predictive model 6002 is recently instantiated, the confidence level can be low but can be expected to increase with iterations of training data applied to the predictive model.

Manager system 110 on the determination that predictive model output data includes sufficient data, can proceed to block 1110 to perform intelligent selection of a next segment from the set of identified segment candidates Segment A-1, Segment A-2, Segment A-3 described in connection with block 1106. Otherwise, if the data is determined to be insufficient at block 1109, manager system 110 can perform selection of a default segment e.g. which can be a segment selected based on preference data of a user or education level of a user, as set forth in users area 2121 in data repository 112.

For intelligent selection of at least one segment out a set of candidate education segments, manager system 110 at block 1110 can select the candidate segment having the set of sentiment parameter values defining the most positive sentiment according to one embodiment. Embodiments herein recognize that users being presented with educational content can express positive sentiment e.g. high "joy" sentiment parameter value when they are successfully learning content that is presented, and, conversely, can exhibit negative sentiment e.g. fear, sadness, or disgust sentiment parameter values. Embodiments herein recognize that users being presented with educational content can express positive sentiment e.g. high "positive" sentiment parameter values when they are successfully learning content that is presented, and, conversely, can exhibit negative sentiment e.g. "negative" sentiment parameter values when they are not successfully learning. Accordingly, manager system 110 at block 1110 can select a candidate education segment in dependence on a predicted set of sentiment parameter values associated to each candidate segment.

According to one embodiment, manager system 110 at block 1110 can examine returned predicted set of sentiment parameter values in the form of a vector having parameter values for each of the sentiment parameters joy, anger, disgust, fear, and sadness.

TABLE B

| CANDIDATE SEGMENT | PREDICTED SET OF SENTIMENT PARAMETER VALUES |
| --- | --- |
| SEGMENT A-1 | "joy" 0.2; "anger" 0.5; "disgust" 0.5 "fear" 0.4; "sadness" 0.3 |
| SEGMENT A-2 | "joy" 0.4; "anger" 0.6; "disgust" 0.3; "fear" 0.2; "sadness" 0.4 |
| SEGMENT A-3 | "joy" 0.8; "anger" 0.2; "disgust" 0.1; "fear" 0.1; "sadness" 0.1 |

According to the example described in reference to Table B, candidate segment A-1 can return a predicted set of sentiment parameter values having a joy sentiment parameter value of 0.2, candidate segment A-2 can have a predicted set of sentiment parameter values of joy, parameter value 0.4, and segment A-3 can have a predicted set of sentiment parameter values joy, parameter value of 0.8. Manager system 110 can select segment A-3, according to one embodiment, based on candidate segment A-3, yielding the highest predicted "joy: sentiment parameter value of 0.8. Embodiments herein recognize that a joy sentiment parameter value can be indictive of a positive sentiment, that users who are learning presented educational content efficiently can be exhibiting high joy sentiment parameter values.

Manager system 110 at block 1110, according to one embodiment, can examine returned predicted set of sentiment parameter values as set forth in Table C. Returned predicted set of sentiment parameter values, as shown in Table B, are polar i.e. positive or negative sentiment values, which can be inverses of one another.

TABLE C

| CANDIDATE SEGMENT | PREDICTED SET OF SENTIMENT PARAMETER VALUES |
| --- | --- |
| SEGMENT A-1 | "POSITIVE" 0.6; "NEGATIVE" 0.4 |
| SEGMENT A-2 | "POSITIVE" 0.8; "NEGATIVE" 0.2 |
| SEGMENT A-3 | "POSITIVE" 0.3; "NEGATIVE" 0.7 |

As shown in Table C, candidate segment A-1 can have a positive sentiment parameter value of 0.6, Segment A-2 can have a positive sentiment parameter value of 0.8, and Segment A-3 can have a positive sentiment parameter value of 0.3. Manager system 110 can select segment A-2 as the next segment out of the set of candidate segments as shown in Table B, based on segment A-2 by querying of a predictive model 6002, returning the highest predicted value for a positive sentiment value, i.e. the predicted positive sentiment value of 0.8.

According to one embodiment, manager system 110 can selected a next segment from a set of candidate segments based on which segment is predicted to induce a highest positive sentiment parameter value, e.g. having a highest "joy" sentiment parameter value associated to a positive sentiment, or a highest "positive" polar sentiment parameter value. According to one embodiment, a mode in which manager system 110 selects a next segment on the basis of which candidate segment is predicted to induce a highest positive sentiment parameter value is activated in response to a current set of sentiment parameter values (which can include one or more value). System 100 can be configured so that manager system 110 activates a mode in which manager system 110 selects a next segment on the basis of which candidate segment is predicted to induce a highest positive sentiment parameter value in response to currently exhibited sentiment of a user, e.g. the sentiment exhibited by the user during playing of a current education segment which precedes the next segment. System 100 can be configured so that manager system 110 activates a mode in which manager system 110 selects a next segment on the basis of which candidate segment is predicted to induce a highest positive sentiment parameter value in response to currently exhibited sentiment of a user having a positive sentiment parameter value below a threshold, e.g. a "joy" parameter value of below a threshold, or a "positive" polar sentiment parameter value of below a threshold. In such manner, system 100 can be configured to induce a positive sentiment on an as-needed basis, e.g. where a positiveness of current sentiment falls below a threshold.

Embodiments herein can include predicting an exhibited sentiment of a certain user on being presented one or more candidate education segment, wherein the predicting is in dependence on historical sentiment parameter values of one or more user on being exposed to presented educational content, the historical sentiment parameter values being stored in a data repository, wherein the presented education segments comprise digital media content adapted for playing by a digital media player; selecting at least one of the one or more candidate education segment in dependence on a result of the predicting so that a selected at least one of the one or more candidate education resulting from the selecting is personalized for the certain user; and presenting to the certain user the selected at least one of the one or more candidate education segment. According to one embodiment, manager system 110 can perform the predicting in dependence on the historical sentiment parameter values based on historical sentiment parameter values being used to train predictive model 6002. Where a user has been previously presented a candidate segment of a set of candidate segments (e.g. as identified by a certain UUID), manager system 110 can predict that the user will exhibit the same set of parameter values as exhibited previously or an average of such values if there is more than one historical instance of a past presentment of an education segment. According to one embodiment, manager system 110 can perform the predicting in dependence on the historical sentiment parameter values by predicting that the user will exhibit the same set of parameter values as exhibited previously or an average of such values if there is more than one historical instance of a past presentment of an education segment.

Manager system 110 on completion of block 1110 can, at block 1112, send presentation command data to the client computer device sending the education initiate data at block 1103, for receipt by that client computer device at block 1304. At block 1304, the client computer device initiating the education session initiate data can play educational content in accordance with the received command data, received at block 1304, i.e. can play the selected education segment out of the set candidate education segments, selected by manager system 110 at block 1110 and/or block 1111.

In response to the playing of educational content, manager system 110 at block 1305 can send sensor output data from the client computer device to manager system 110 for receipt by manager system at block 1113. The sensor output data can be time stamped, and the presentation command data sent at block 1112 can be time stamped, so that manager system 110 can associate received output data at block 1113, with a played education segment that induced the received sensor output data at block 1113. In response to receiving sensor output data at block 1113, manager system 110 can proceed to block 1114.

At block 1114, manager system can perform sentiment parameter value generating e.g. to return set of sentiment parameter values for a user associated with presented education segment, presented to the user at block 1304. Manager system 110, performing sentiment parameter value generating at block 1114, can include manager system 110 activating sentiment determining process 116.

Manager system 110 performing block 1113 can include manager system 110 activating sentiment determining process 116 and returning one or more sentiment parameter value e.g. based on processing of video image data representing facial expressions, based on processing of video image data representing eye gaze and/or based on processing of EEG sensor output data indicative of EEG signals that measure brain electrical activity.

Returned sentiment parameter values can be provided in the form of a set of sentiment parameter values, e.g. a polar set of sentiment parameter values, as shown in Table B, or a five sentiment parameter value set of parameter values as shown in Table C, wherein sentiment parameter values provided by values for a set of sentiment parameters including the sentiment parameters joy, anger, disgust, fear, and sadness. Manager system 110 at block 1114 can send returned sentiment parameter values, generated at block 1113 to data repository for storage into data repository 112.

Manager system 110 running sentiment determining process 116 can include manager system 110 processing facial feature representing video data as received using a sensor of sensor system 133 provided by a camera sensor. Such processing can employ commercially available software, e.g., EMOTION VIDEO ANALYTICS™ software by nVISO™ of Lausanne, Switzerland available on IBM SmartCloud® services (IBM SmartCloud® is a registered trademark of International Business Machines Corporation). Video-based sentiment analysis can return various sentiment parameters including, e.g., anger, disgust, fear, sadness and/or joy. Video-processing sentiment analysis can return parameter values in the form of confidence levels, e.g., for the sentiment parameter "joy", sentiment parameter value of 0.85 indicates an 85% level of confidence that a current sentiment is joyful. Video processing sentiment analysis can also return polar sentiment parameters, e.g., the parameters of "positive sentiment" or "negative sentiment".

Manager system 110 running sentiment determining process 116 can include manager system 110 processing eye gaze representing video data as received using a sensor of sensor system 133 provided by a camera sensor. Such processing can employ commercially available software, e.g., STICKY™ software by Tobii Technology, Inc. of Falls Church, Va. (STICKY™ is a trademark of Tobii Technology, Inc. of Falls Church, Va.). Video-processing sentiment analysis can return parameter values in the form of confidence levels, e.g., for the sentiment parameter "joy", sentiment parameter value of 0.85 indicates an 85% level of confidence that a current sentiment is joyful. Video processing sentiment analysis can also return polar sentiment parameters, e.g., the parameters of "positive sentiment" or "negative sentiment". Various rules based criterion can be used to map eye gaze patterns to positive sentiment. For example, manager system 110 can return high positive sentiment parameter values when a "recognitive" or "evaluative" eye pattern is identified, wherein a "recognitive" eye gaze pattern is characterized by (<2 seconds) pupil focus, dropped head; show willingness to begin conversation with target, and where an "Evaluative" eye gaze pattern is characterized by: (<5 seconds) squinting, furrowed brow, cocked head; convince target of high self-value, then reward target with judgment. A camera sensor optimized for eye gaze tracking can be utilized.

Manager system 110 running sentiment determining process 116 can include manager system 110 processing EEG signal data as received using a sensor of sensor system 133 provided by an EEG sensor. Such processing can employ publicly available software such as software of the DEAP™ dataset software package available from Queen Mary University of London, London, UK (DEAP™ is a trademark in use by Queen Mary University of London, London, UK). EEG-based sentiment analysis can return various sentiment parameters including, e.g., anger, disgust, fear, sadness and/or joy. Video-processing sentiment analysis can return parameter values in the form of confidence levels, e.g., for the sentiment parameter "joy", sentiment parameter value of 0.85 indicates an 85% level of confidence that a current sentiment is joyful. Video processing sentiment analysis can also return polar sentiment parameters, e.g., the parameters of "positive sentiment" or "negative sentiment".

Data repository 112 at block 1123 can receive the returned sentiment parameter values and can store the returned sentiment parameter values into education results area 2124 of data repository 112. Manager system 110 at block 1116 can send learning training data for receipt by machine learning system 1140 at block 1404. On receipt of the machine learning training data, at block 1404, machine learning system 140 can apply the received machine learning training data to a predictive model 6002 that has been instantiated for the user, initiating an education session at block 1303.

Machine learning system 140 at block 1404 can apply training data for the current education segment presentment instance described in connection with block 1304 in a manner set forth herein. In reference to FIG. 6, at block 1117, manager system 110 can determine whether the current segment is the last sessions specified by user configuration education session initiate data sent at block 1303. For example, a selected education session can have a predetermined number of segments or an adaptive number of segments wherein an education session can be terminated based on one or more criterion being satisfied which criterion can be user configurable. If the preceding education segment is not the last segment of a selected education session, manager system 110 can return to block 1106 to identify a next set of segment candidates e.g. with reference to Table A, can identify in the described example the segments Segment B-1, Segment B-2, Segment B-3. In a response to a determination at block 1117 that a current education segment is the last segment of education session, manager system 110 can proceed to block 1118 to end the current education session.

Determination of content of an education session, according to one embodiment, can include additional machine learning training processes, including training of predictive model 7002A-7002Z as set forth in FIG. 1. Predictive models can predict a performance of a user in dependence of a sentiment being experienced by a user. Training of predictive models 7002A-7002Z are described herein with reference to FIG. 7. According to some embodiments, educational content presented to users of system 100 can include question and answer content that tests the user's performance in retaining content of the presented educational content. For example, presented educational content can include embedded questions that are presented for answering by user at a close of an education segment or at a close of an education session.

Entered answer data that is entered by a user using e.g. user interface 5000 can be stored by manager into data repository 112 e.g. into education results area 2124. Question and answer results data can also be applied by manager system 110 as training data for training of predictive model 7002.

Figure 7:
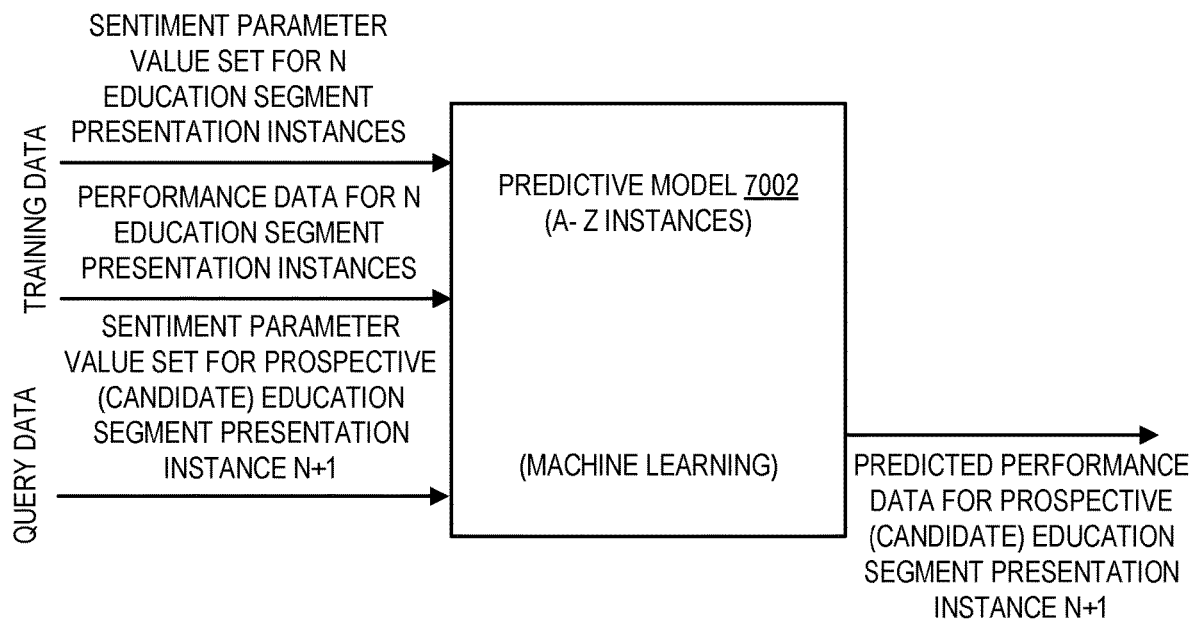
FIG. 7 depicts a predictive model that can be trained using supervised machined learning processes, according to one embodiment.

According to one embodiment, manager system 110, at block 1118, can send to machine learning system 140, machine learning training data for training predictive models 7000A-7000Z where there can be instantiated one of the predictive models 7002A-7002Z for each user of system 100. Training of a predictive model 7002, having the instances A-Z e.g. the predictive models 7002A-7002Z, are described further in reference to FIG. 7. Predictive model 7002, as shown in FIG. 7 (representative of any of predictive models 7002A-7002Z) can be trained with use of supervised machine learning. Predictive model 7002, can be trained with use of training data. Training data can include, for each of N education segment presentation instances, a set of sentiment parameter values and performance data, with a set of sentiment parameter values can be a set of sentiment parameter values as described in connection with Table B or Table C and wherein performance data is question and answer result performance data, wherein the user can respond to a question presented by manager system to test whether the user has retained content of a presented education segment, defining an education session.

Predictive model 7002, as shown in FIG. 7, once trained by machine learning is able to respond to query data. Query data, applied to predictive model 7002, according to one embodiment, can take the form of a set of prospective sentiment parameter values for a segment presentation instance e.g. the instance N+1, as shown in FIG. 7, where predictive model 7002 has be trained using set of sentiment parameter values and performance data for N education presentation segment instances. In response to the query data, provided by a sentiment for perspective education segment presentation, predictive model 7002 can return predicted performance data for the perspective education segment presentation instance N+1.

In connection with Table B and C it was described that, according to one embodiment, manager system 110 can select a next education segment on the basis of which education segment is predicted to produce a highest value positive sentiment e.g. either a highest value for a joy sentiment parameter or a highest value for a polar positive sentiment parameter. According to another embodiment, a next education segment out of a candidate education segments can be selected on the basis of which candidate segment is predicted to induce a set of sentiment parameter values as exhibited by a user when the user is optimally performing e.g. optimally performing in terms of retaining presented content. For such processing, according to one embodiment, manager system 110 can apply, for each candidate segment, as shown Table B or Table C, the predicted set of sentiment parameter values, as shown in Table B or Table C into predictive model 7002 and in response to the query data, predictive model 7002 can return a predicted performance data for the input perspective predicted set of sentiment parameter values.

Manager system 110 can thus return for each candidate education segment predicted performance data, and manager system 110 can select a candidate segment producing the most desirable predicted performance data (in terms of predicted exhibited sentiment, e.g. the most positive sentiment as set forth herein) as the next education segment.

Figure 5:
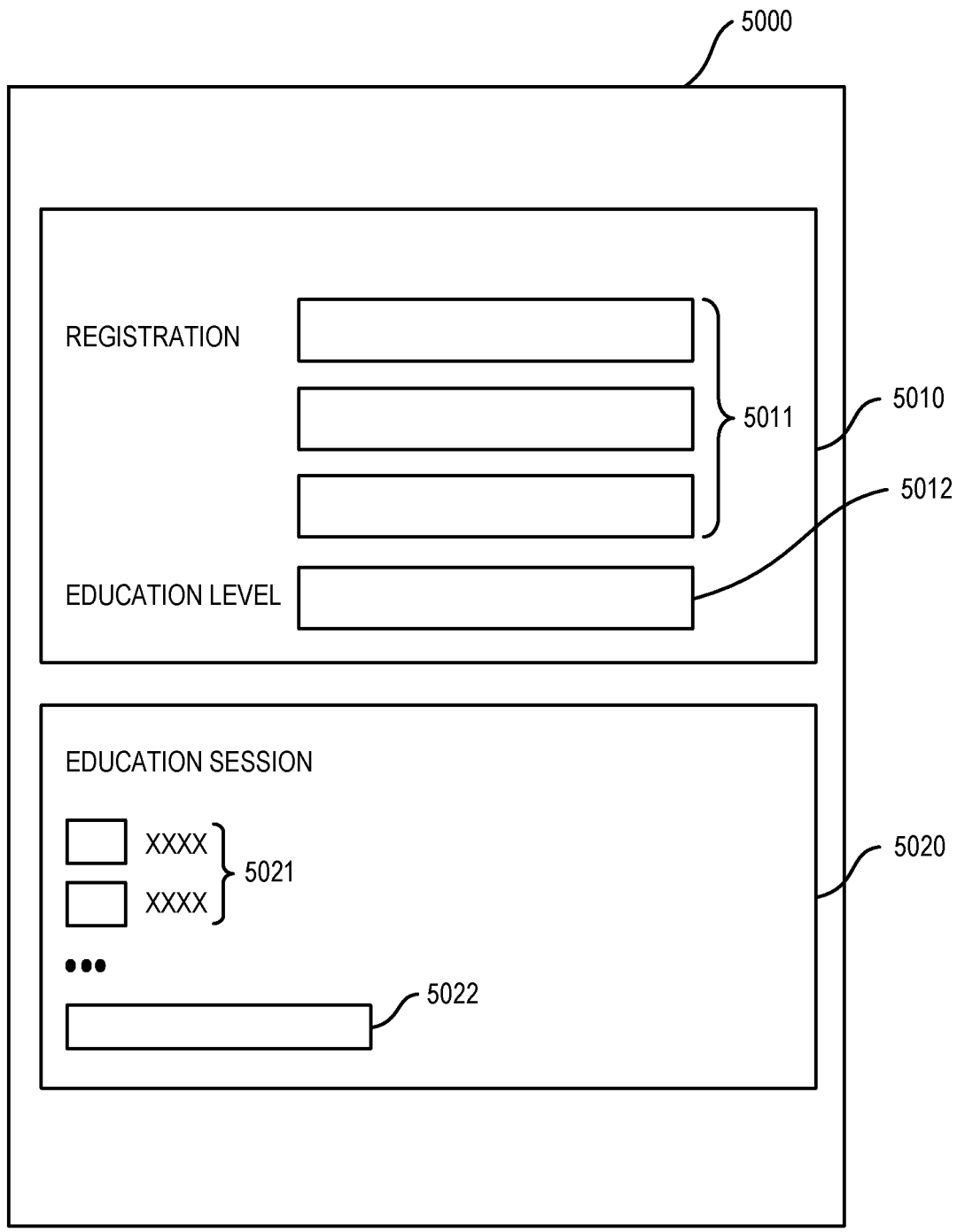
FIG. 5 depicts a displayed user interface that can be displayed on a display of a client computer device, according to one embodiment.

Additional features are set forth in reference to block 1119 to block 1122. Some time after manager system 110 ends an education session at block 1118, client computer device 130Z, which is currently not registered into system 100, can send at block 2301 registration data for receipt by manager system 110. The registration data can be defined by user of client computer device 130Z, using area 5010 of user interface 5000 as shown in FIG. 5. Manager system 110 at block 1119 can proceed to block 1120 to send received registration data to data repository 112 for receipt in storage by data repository 112 at block 1124.

At block 1121, manager system 110 can send an installation package e.g. including libraries and executable code to client computer device 130Z, for receipt manager system, for receipt by client computer device 130Z, at block 2302, client computer device 130Z can receive and install the installation package sent at block 1121. The installation package can include e.g. libraries and executable code which e.g. facilitates client computer device 130Z playing digital content of an education session and which also can facilitate client computer device 130Z, sending sensor output data to manager system 110 for use by manager system 110 to the user in response to presented education segments, client computer device 130Z can send education session initiate data for receipt by manager system 110 at block 1122.

Processing hereafter can continue by manager system 110 in the manner as set forth in blocks 1106-1118. It was noted previously, in reference to block 1109, that in the case that a predictive model 6002 queried by manager system 110 has insufficient data, manager system 110 can select the default education segment as a next segment. According to one embodiment, manager system 110 at block 1109 can examine other data sources for purposes of making a determination of whether there is sufficient data for manager system 110 to return an intelligent selection of a next education segment, rather than simply apply a default selection. As noted in reference to FIG. 1, manager system 110 can run similarity identifying process 117, in which manager system 110 can identify users to exhibit sentiment behaviors that are similar to a certain user.

In the case that a predictive model 6002Z and/or predictive model 7002Z for the certain user of client computer device 130Z is insufficiently trained, manager system 110, according to some embodiments, can query one or more predictive model associated to one or more other users (other than the certain user), based on other users exhibiting sentiment behavior patterns that are similar to sentiment behavior pattern, exhibited by the user of client computer device 130Z. At the time of performance of block 1109, for the user of client computer device 130Z where predictive models 6002Z and 7002Z for the user of client computer device 130Z are insufficiently trained.

Manager system 110 can examine data of education results area 2124 to identify one or more users of system 100 having sentiment behavior patterns that are similar to the sentiment behavior pattern of the user of client computer device 130Z. For such processing, manager system 110 can examine data of all users of system 100 who have been presented with education segments that have been previously presented to the certain user of client computer device 130Z e.g. as identified by UUIDs, associated with such education segments.

According to one embodiment, such previously applied education segments can be few in number e.g. can comprise one to a limited number of previously presented education segments. Manager system 110 can identify other users of system 100 who also were presented with the same education segments that have been presented to the user of client computer device 130Z. Manager system 110 can then plot in coordinate space set of sentiment parameter values exhibited by the other users when presented with the education segments commonly presented to the user of client computer device 130Z. Manager system 110 can examine the plotted data to identify by cluster analysis, e.g. K-means cluster analysis, one or more other user of system 100, exhibiting sentiment behavior that is most similar to the exhibited sentiment behavior of the user of client computer device 130Z, where one or more other users are identified exhibiting sentiment behaviors similar to the user of client computer device 130Z. Various clustering methodologies can be used, e.g. connectivity-based clustering, centroid-based clustering, distribution-based clustering, density-based clustering.

Manager system 110 can return to block 1107 to apply query data to predictive models associated to such identified one or more user for receipt by machine learning system 140 at block 1402, and for responsive return of predictive model output data at block 1403. Manager system 110 can use cluster analysis to identify users exhibiting sentiment behavior patterns, similar to the sentiment behavior pattern exhibited by the user of client computer device 130Z and can use predictive models associated with such other users for return of predictive model output data and intelligent selection at block 1110 of a next education segment, where the selection of the next education segment is selected to optimize the performance of system 100 in education the user of client computer device 130Z e.g. for selection of a next segment to optimize a positive sentiment parameter value e.g. for a selection of a next education segment to return a predicted highest valued positive sentiment parameter value, or to return a predicted sentiment parameter value in a manner predicted to optimize performance of a user of client computer device 130Z e.g. using bother predictive model 6002 as shown in FIG. 6 and predictive model 7002 as shown in FIG. 7.

Embodiments herein feature a system and associated methods for digital content pre-personalization via smart intervention in the form of user-specific preprocessing of content to be presented to a given user for consumption. Embodiments herein can feature first learning (in a controlled setting, such as a calibration stage) biometric signals a given individual (user) generates with respect to given content, as well as by identifying how other similarly other users react for the given content segment and then in the operational phase exploiting this learning to personalize the content for the user. According to one embodiment, manager system 110 can personalize content by replacing "more difficult" content by "less difficult" ones (where the difficulty is computed "personally" for the given user's known brain reaction towards that content). Manager system 110 can identify similar users of a set of users with application e.g. of clustering methodologies. Manager system 110 can use biometric signals (e.g. brain electrical signals as provided by EEG signals) of other similar users to gauge the potential reaction of the current user in response to being presented with educational content not previously observed by the current user.

Certain embodiments herein may offer various technical computing advantages involving computing advantages to address problems arising in the realm of computer system networks. Embodiments herein can include artificial intelligence (AI) processing, including machine learning processing. Embodiments herein can include predictive models trained by supervised machine learning to perform various functions such as predicting exhibited user sentiment behaviors in response to certain and characterized education segments, having certain topic and content classifications. Predictive models can also be employed to predict a performance of a user for various sentiment behaviors of a user, such predictive model can also be trained with use of supervised machine learning processes. NLP processes can be used to return topics associated to educational content defining an education segment of an education session. Embodiments herein can provide technical computing advantages involving computing advantages to address problems arising in the realm of computer systems, in the environment of computer systems having user interfaces. Embodiment herein can include automatically sensing and predicting behaviors of users and employing data decisions based on sensed data to drive automated presentments of content and other processes for reduced reliance on manually operated user interfaces. Embodiments herein can provide technical computing advantages involving computing advantages to address problems arising in the realm of computer systems, in the environment of online education systems in which a user is presented educational content such as digital educational content on a client computer device having a display and audio output, e.g. so that users can be trained with reduced computer system resource consumption and with reduced reliance on manual interface for controls for selection and presentment of content. Sensor output data that is sensitive to sentiments exhibited by a user can be provided to a manager system which processes sensor output data to return a set of sentiment parameter values and educational content that is presented to a user in the form of education segments can be adaptively presented in dependence on a determined sentiment parameter value for a user. Processing performed by a manager system for adaptive control of educational content can employ various artificial intelligence (AI) processes and machine learning processes. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as biometric signal producing sensors of alternative types, e.g. camera sensor and EEG sensor. Embodiments herein can include artificial intelligence processing platforms featuring improved processes to transform unstructured data into structured form permitting computer based analytics and decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription. The static optimization service may be provided for subscribed business entities and/or individuals in need from any location in the world.

Figure 8:
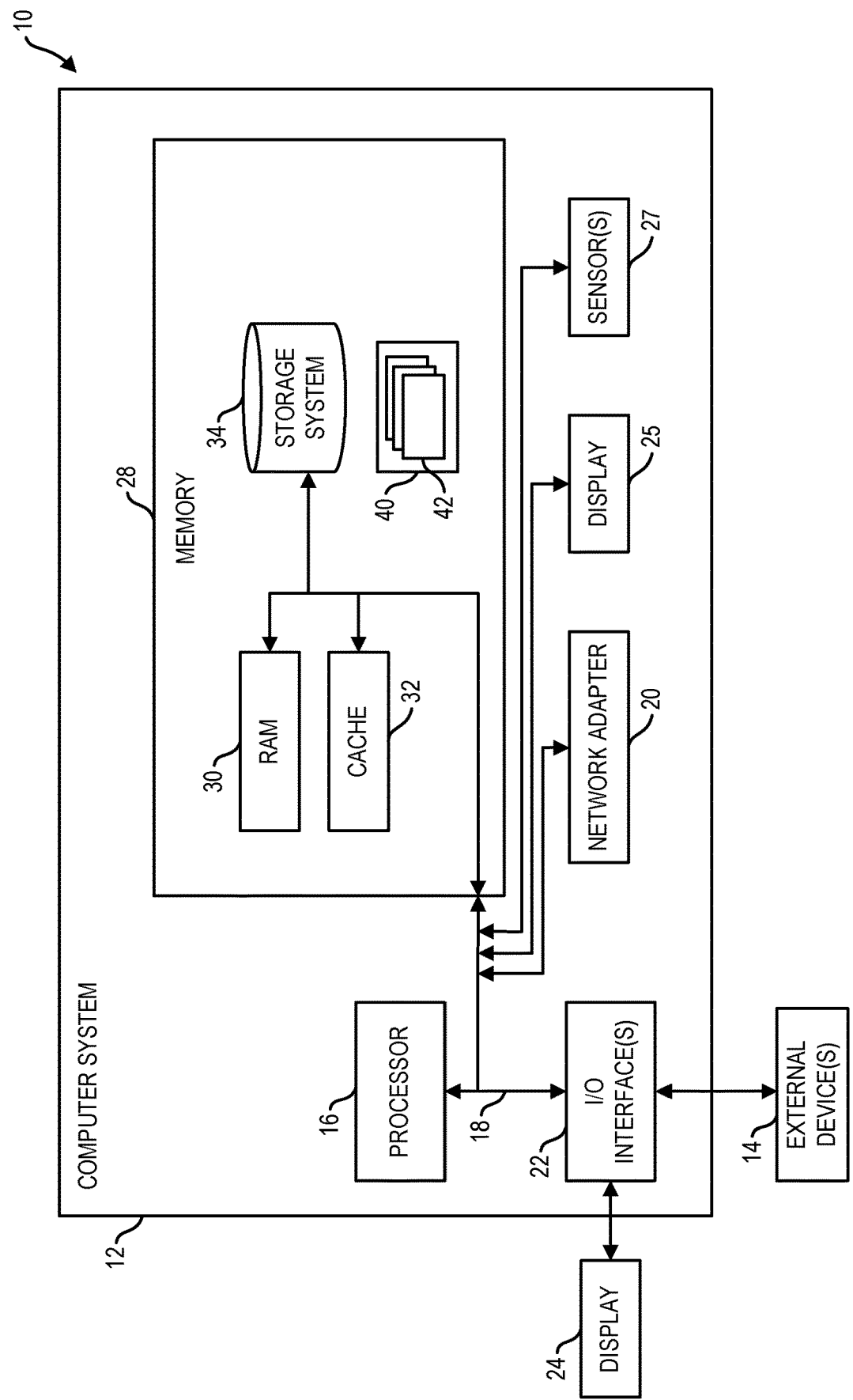
FIG. 8 depicts a computing node according to one embodiment.
Figure 9:
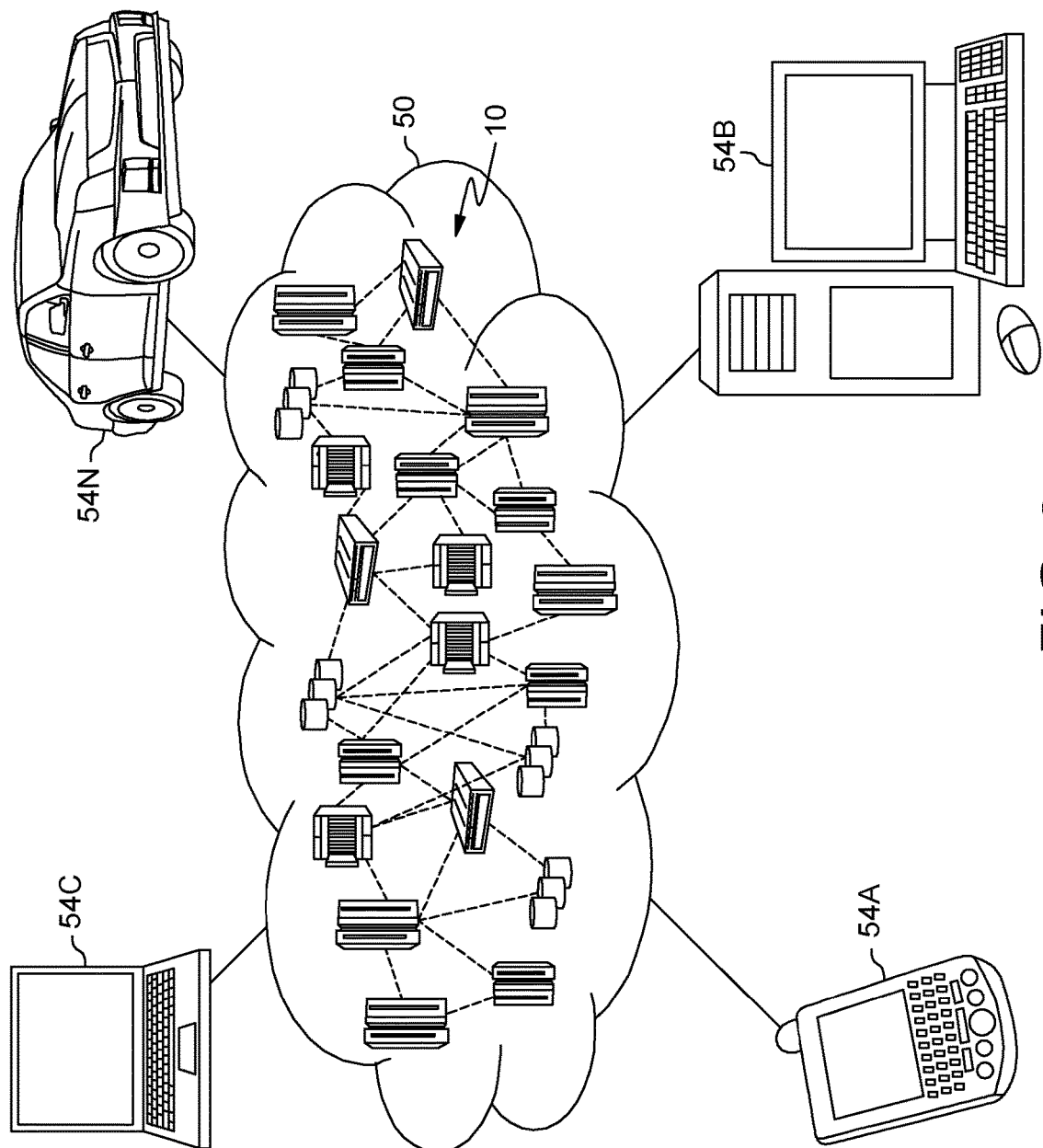
FIG. 9 depicts a cloud computing environment according to one embodiment.
Figure 10:
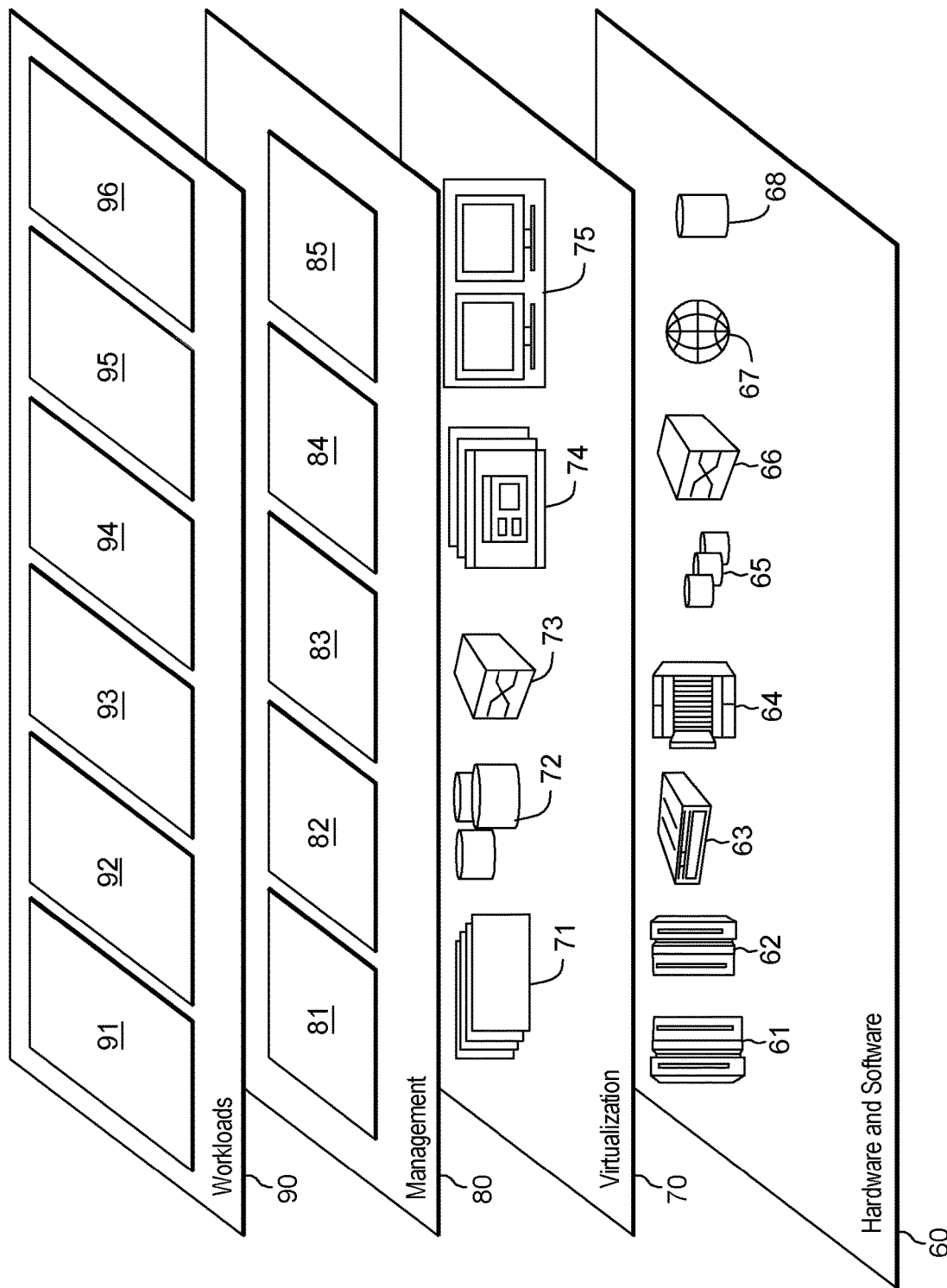
FIG. 10 depicts abstraction model layers according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 300 of FIG. 3 and functions described with reference to manager system 110 as set forth in the flowchart of FIGS. 4A-4B. In one embodiment, one or more client computer device 130A-130Z can include one or more computing node 10 and can include one or more program 40 for performing functions described with reference to one or more client computer device 130A-130Z as set forth in the flowchart of FIGS. 4A-4B. In one embodiment, machine learning system 140 can include one or more computing node 10 and can include one or more program 40 for performing functions described with reference to machine learning system 140 as set forth in the flowchart of FIGS. 4A-4B. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for intelligent selection and presentment of educational content as set forth herein. The processing components 96 can be implemented with use of one or more program 40 described in FIG. 8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
predicting an exhibited sentiment of a certain user on being presented one or more candidate education segment, wherein the predicting is in dependence on historical sentiment parameter values of one or more user on being exposed to presented educational content, the historical sentiment parameter values being stored in a data repository, wherein the one or more candidate education segment comprises digital media content adapted for playing by a digital media player, wherein the historical sentiment parameter values are derived using biometric sensor output data of the certain user collected with the certain user being exposed to presented educational content;
selecting at least one of the one or more candidate education segment in dependence on a result of the predicting so that a selected at least one of the one or more candidate education segment resulting from the selecting is personalized for the certain user, wherein the selecting the at least one of the one or more candidate education segment includes querying a predictive model that has been trained by supervised machine learning for predicting sentiment response of the certain user wherein training of the predictive model includes applying training data to the predictive model, the training data including sentiment parameter value data of the historical sentiment parameter values derived using biometric sensor output data of the certain user collected with the certain user being exposed to presented educational content, wherein the selecting the at least one of the one or more candidate education segment is performed, for improved engagement of the certain user to a defined user interface, to induce a sentiment of the certain user determined to be a sentiment exhibited by the certain user when the certain user optimally retains presented educational content, wherein the method includes ascertaining a sentiment exhibited by the certain user when the certain user optimally retains presented educational content using a trained predictive model trained by machine learning, the trained predictive model being trained to return predicted educational content retention data in response to applied query data that includes a set of sentiment parameter values, wherein the selecting the at least one of the one or more candidate education segment includes querying the predictive model that has been trained by supervised machine learning for predicting sentiment response of the certain user with characterizing data of the one or more candidate education segment and ascertaining, based on a result of the querying of the predictive model, that the at least one of the one or more candidate education segment will induce the certain user to exhibit a threshold satisfying sentiment parameter value that coincides with the sentiment exhibited by the certain user when the certain user optimally retains presented educational content; and
presenting to the certain user the selected at least one of the one or more candidate education segment personalized for the certain user and selected, for improved engagement of the certain user to the defined user interface, to induce the sentiment of the certain user determined to be the sentiment exhibited by the certain user when the certain user optimally retains presented educational content, wherein during an education session the predicting, the selecting, and the presenting are iteratively performed so that there are presented during the education session a sequence of selected candidate education segments, and wherein the predictive model is iteratively retrained during the education session with use of obtained biometric sensor output data of the certain user obtained during the education session so that the iteratively selecting of candidate education segments during the education session for presenting to the certain user is in dependence on the biometric sensor output data of the certain user obtained during the education session.

2. The method of claim 1, wherein the one or more candidate education segment includes a plurality of candidate education segments, wherein the querying the predictive model that has been trained by supervised machine learning for predicting sentiment response of the certain user includes querying the predictive model with characterizing data of each of the plurality of the candidate education segments to return from the predictive model a predicted sentiment of the certain user associated to respective ones of the plurality of candidate education segments, and wherein the selecting includes identifying amongst the plurality of candidate education segments which candidate education segment will induce a sentiment of the certain user that coincides with the sentiment exhibited by the certain user when the certain user optimally retains presented educational content.

3. The method of claim 1, wherein the training data includes, for instances of presented education segments presented to the certain user (i) sentiment parameter value data of the historical sentiment parameter values derived using biometric sensor output data of the certain user collected with the certain user being exposed to presented educational content, and (ii) topic parameter value data extracted by subjecting text based candidate educational segment content to natural language processing.

4. The method of claim 1, wherein the training data includes topic parameter value data extracted by subjecting text based candidate educational segment content to natural language processing.

5. The method of claim 1, wherein the biometric sensor output data includes video data representing facial expressions and eye gaze patterns of the certain user.

6. The method of claim 1, wherein the selecting includes identifying amongst a plurality of candidate education segments which candidate education segment will induce a sentiment of the certain user that coincides with the sentiment exhibited by the certain user when the certain user optimally retains presented educational content.

7. The method of claim 1, wherein the biometric sensor output data includes video data representing facial expressions.

8. The method of claim 1, wherein the biometric sensor output data includes video data representing eye gaze patterns of the certain user.

9. A system comprising:
a memory;
at least one processor in communication with the memory; and
program instructions executable by one or more processor via the memory to perform a method comprising:
predicting an exhibited sentiment of a certain user on being presented one or more candidate education segment, wherein the predicting is in dependence on historical sentiment parameter values of one or more user on being exposed to presented educational content, the historical sentiment parameter values being stored in a data repository, wherein the one or more candidate education segment comprises digital media content adapted for playing by a digital media player, wherein the historical sentiment parameter values are derived using biometric sensor output data of the certain user collected with the certain user being exposed to presented educational content;
selecting at least one of the one or more candidate education segment in dependence on a result of the predicting so that a selected at least one of the one or more candidate education segment resulting from the selecting is personalized for the certain user, wherein the selecting the at least one of the one or more candidate education segment includes querying a predictive model that has been trained by supervised machine learning for predicting sentiment response of the certain user wherein training of the predictive model includes applying training data to the predictive model, the training data including sentiment parameter value data of the historical sentiment parameter values derived using biometric sensor output data of the certain user collected with the certain user being exposed to presented educational content, wherein the selecting the at least one of the one or more candidate education segment is performed, for improved engagement of the certain user to a defined user interface, to induce a sentiment of the certain user determined to be a sentiment exhibited by the certain user when the certain user optimally retains presented educational content, wherein the method includes ascertaining a sentiment exhibited by the certain user when the certain user optimally retains presented educational content using a trained predictive model trained by machine learning, the trained predictive model being trained to return predicted educational content retention data in response to applied query data that includes a set of sentiment parameter values, wherein the selecting the at least one of the one or more candidate education segment includes querying the predictive model that has been trained by supervised machine learning for predicting sentiment response of the certain user with characterizing data of the one or more candidate education segment and ascertaining, based on a result of the querying of the predictive model, that the at least one of the one or more candidate education segment will induce the certain user to exhibit a threshold satisfying sentiment parameter value that coincides with the sentiment exhibited by the certain user when the certain user optimally retains presented educational content; and
presenting to the certain user the selected at least one of the one or more candidate education segment personalized for the certain user and selected, for improved engagement of the certain user to the defined user interface, to induce the sentiment of the certain user determined to be the sentiment exhibited by the certain user when the certain user optimally retains presented educational content, wherein during an education session the predicting, the selecting, and the presenting are iteratively performed so that there are presented during the education session a sequence of selected candidate education segments, and wherein the predictive model is iteratively retrained during the education session with use of obtained biometric sensor output data of the certain user obtained during the education session so that the iteratively selecting of candidate education segments during the education session for presenting to the certain user is in dependence on the biometric sensor output data of the certain user obtained during the education session.

10. The system of claim 9, wherein the one or more candidate education segment includes a plurality of candidate education segments, wherein the querying the predictive model that has been trained by supervised machine learning for predicting sentiment response of the certain user includes querying the predictive model with characterizing data of each of the plurality of the candidate education segments to return from the predictive model a predicted sentiment of the certain user associated to respective ones of the plurality of candidate education segments, and wherein the selecting includes identifying amongst the plurality of candidate education segments which candidate education segment will induce a sentiment of the certain user that coincides with the sentiment exhibited by the certain user when the certain user optimally retains presented educational content.

11. The system of claim 9, wherein the training data includes, for instances of presented education segments presented to the certain user (i) sentiment parameter value data of the historical sentiment parameter values derived using biometric sensor output data of the certain user collected with the certain user being exposed to presented educational content, and (ii) topic parameter value data extracted by subjecting text based candidate educational segment content to natural language processing.

12. The system of claim 9, wherein the training data includes topic parameter value data extracted by subjecting text based candidate educational segment content to natural language processing.

13. The system of claim 9, wherein the biometric sensor output data includes video data representing facial expressions and eye gaze patterns of the certain user.

14. The system of claim 9, wherein the selecting includes identifying amongst a plurality of candidate education segments which candidate education segment will induce a sentiment of the certain user that coincides with the sentiment exhibited by the certain user when the certain user optimally retains presented educational content.

15. The system of claim 9, wherein the biometric sensor output data includes video data representing facial expressions.

16. The system of claim 9, wherein the biometric sensor output data includes video data representing eye gaze patterns of the certain user.

17. A computer program product comprising:
a computer readable storage medium readable by one or more processing circuit and storing instructions for execution by one or more processor for performing the method comprising:
predicting an exhibited sentiment of a certain user on being presented one or more candidate education segment, wherein the predicting is in dependence on historical sentiment parameter values of one or more user on being exposed to presented educational content, the historical sentiment parameter values being stored in a data repository, wherein the one or more candidate education segment comprises digital media content adapted for playing by a digital media player, wherein the historical sentiment parameter values are derived using biometric sensor output data of the certain user collected with the certain user being exposed to presented educational content;
selecting at least one of the one or more candidate education segment in dependence on a result of the predicting so that a selected at least one of the one or more candidate education segment resulting from the selecting is personalized for the certain user, wherein the selecting the at least one of the one or more candidate education segment includes querying a predictive model that has been trained by supervised machine learning for predicting sentiment response of the certain user wherein training of the predictive model includes applying training data to the predictive model, the training data including sentiment parameter value data of the historical sentiment parameter values derived using biometric sensor output data of the certain user collected with the certain user being exposed to presented educational content, wherein the selecting the at least one of the one or more candidate education segment is performed, for improved engagement of the certain user to a defined user interface, to induce a sentiment of the certain user determined to be a sentiment exhibited by the certain user when the certain user optimally retains presented educational content, wherein the method includes ascertaining a sentiment exhibited by the certain user when the certain user optimally retains presented educational content using a trained predictive model trained by machine learning, the trained predictive model being trained to return predicted educational content retention data in response to applied query data that includes a set of sentiment parameter values, wherein the selecting the at least one of the one or more candidate education segment includes querying the predictive model that has been trained by supervised machine learning for predicting sentiment response of the certain user with characterizing data of the one or more candidate education segment and ascertaining, based on a result of the querying of the predictive model, that the at least one of the one or more candidate education segment will induce the certain user to exhibit a threshold satisfying sentiment parameter value that coincides with the sentiment exhibited by the certain user when the certain user optimally retains presented educational content; and
presenting to the certain user the selected at least one of the one or more candidate education segment personalized for the certain user and selected, for improved engagement of the certain user to the defined user interface, to induce the sentiment of the certain user determined to be the sentiment exhibited by the certain user when the certain user optimally retains presented educational content, wherein during an education session the predicting, the selecting, and the presenting are iteratively performed so that there are presented during the education session a sequence of selected candidate education segments, and wherein the predictive model is iteratively retrained during the education session with use of obtained biometric sensor output data of the certain user obtained during the education session so that the iteratively selecting of candidate education segments during the education session for presenting to the certain user is in dependence on the biometric sensor output data of the certain user obtained during the education session.

18. The computer program product of claim 17, wherein the selecting includes identifying amongst a plurality of candidate education segments which candidate education segment will induce a sentiment of the certain user that coincides with the sentiment exhibited by the certain user when the certain user optimally retains presented educational content.

19. The computer program product of claim 17, wherein the biometric sensor output data includes video data representing facial expressions.

20. The computer program product of claim 17, wherein the biometric sensor output data includes video data representing eye gaze patterns of the certain user.

\* \* \* \* \*